United States Patent
Wu et al.

(10) Patent No.: US 11,916,271 B2
(45) Date of Patent: Feb. 27, 2024

(54) STABLE AND HIGH-CAPACITY NEUTRAL AQUEOUS REDOX FLOW LITHIUM BATTERY BASED ON A REDOX-TARGETING REACTION

(71) Applicants: Harbin Institute of Technology, Harbin (CN); Chongqing Research Institute of Harbin Institute of Technology, Chongqing (CN)

(72) Inventors: Xiaohong Wu, Harbin (CN); Songtao Lu, Harbin (CN); Wei Qin, Harbin (CN); Xin Jia, Harbin (CN); Yuan Yao, Harbin (CN); Yang Li, Harbin (CN)

(73) Assignees: HARBIN INSTITUTE OF TECHNOLOGY, Harbin (CN); CHONGQING RESEARCH INSTITUTE OF HARBIN INSTITUTE OF TECHNOLOGY, Chongqing (CN)

( * ) Notice: Subject to any disclaimer, the term of this patent is extended or adjusted under 35 U.S.C. 154(b) by 114 days.

(21) Appl. No.: 17/851,512

(22) Filed: Jun. 28, 2022

(65) Prior Publication Data
US 2022/0336838 A1    Oct. 20, 2022

Related U.S. Application Data

(63) Continuation of application No. PCT/CN2022/071744, filed on Jan. 13, 2022.

(30) Foreign Application Priority Data

Apr. 20, 2021    (CN) .......................... 202110425082.4

(51) Int. Cl.
H01M 8/18    (2006.01)
H01M 4/36    (2006.01)
(Continued)

(52) U.S. Cl.
CPC ........... *H01M 8/188* (2013.01); *H01M 4/368* (2013.01); *H01M 4/58* (2013.01); *H01M 4/623* (2013.01);
(Continued)

(58) Field of Classification Search
CPC ........ H01M 8/188; H01M 4/368; H01M 4/58; H01M 4/623; H01M 2300/0002
See application file for complete search history.

(56) References Cited

U.S. PATENT DOCUMENTS

2018/0337432 A1 * 11/2018 Hsu ...................... H01M 4/364
2019/0240623 A1 * 8/2019 Beh ..................... B01D 53/1425

FOREIGN PATENT DOCUMENTS

CN    111354965 A    6/2020
CN    112151843 A    12/2020
(Continued)

OTHER PUBLICATIONS

Juezhi Yu et al. "Redox targeting-based aqueous redox flow lithium battery" ACS Energy Letteers Sep. 6, 2018 V10 (3).

*Primary Examiner* — Stewart A Fraser
(74) *Attorney, Agent, or Firm* — IPRO, PLLC

(57) ABSTRACT

The present disclosure discloses a stable and high-capacity neutral aqueous redox flow lithium battery based on redox-targeting reaction and belongs to the technical field of flow lithium batteries. The present disclosure solves the technical problem that an existing flow battery can only work at low current density. The flow lithium battery of the present disclosure includes a positive electrode storage tank and a negative electrode storage tank; the positive electrode storage tank is filled with a positive electrolyte; and the negative electrode storage tank is filled with a negative electrolyte. The flow lithium battery is characterized in that the positive electrolyte includes a salt containing $[Fe(CN)_6]^{4-}$ and/or $[Fe(CN)_6]^{3-}$, and the positive electrode storage tank is
(Continued)

further filled with LFP particles and/or FP particles. The flow lithium battery of the present disclosure has wide application prospects in the field of large-scale energy storage.

5 Claims, 10 Drawing Sheets

(51) Int. Cl.
    *H01M 8/08*     (2016.01)
    *H01M 4/62*     (2006.01)
    *H01M 4/58*     (2010.01)

(52) U.S. Cl.
    CPC ...... *H01M 8/08* (2013.01); *H01M 2300/0002* (2013.01)

(56) References Cited

FOREIGN PATENT DOCUMENTS

| | | | |
|---|---|---|---|
| JP | 2018186014 A | 11/2018 | |
| WO | 2019054947 A1 | 3/2019 | |
| WO | 2020204830 A1 | 10/2020 | |

\* cited by examiner

STABLE AND HIGH-CAPACITY NEUTRAL AQUEOUS REDOX FLOW LITHIUM BATTERY BASED ON A REDOX-TARGETING REACTION

TECHNICAL FIELD

The present disclosure belongs to the technical field of flow batteries and particularly relates to a stable and high-capacity neutral aqueous redox flow lithium battery based on a redox-targeting reaction.

BACKGROUND

With the gradual exhaustion of fossil energy and pollution of the ecological environment, it is imperative to develop new energy. In order to solve problems of instability, discontinuity and uncontrollability of the new energy in a development process, peak regulation and frequency modulation in a grid-connection process and the like, a high-capacity electric energy storage technology must be developed. Compared with other electrochemical energy storage technologies, a redox flow battery (RFB) has the advantage that energy storage and power output are mutually independent, scale production is easy to realize and the like, so it becomes one of the preferred technologies for large-scale fixed energy storage. As a most mature RFB technology, a vanadium flow battery (VFB) has been used on an MW/MWh scale. However, the VFB has low energy density (25-30 Wh/L), high cost, poor thermal stability, and strong corrosiveness and toxicity, thus use of the VFB in the energy storage is seriously hindered.

To address the problems of the VFB, flow battery systems of different electrolytes have been developed. However, the solubility of the active substances in the electrolyte is low, resulting in low energy density of conventional flow batteries. Although a semi-solid flow battery with high active substance concentration has relatively high energy density, the viscosity of the suspension is high, which leads to poor fluidity, thus the semi-solid flow battery cannot meet the requirement of practical use.

By contrast, a flow battery based on a redox-targeting reaction integrates the advantages of the traditional redox flow battery and the semi-solid flow battery. The electric energy is stored in a solid energy storage material by the redox-targeting reaction between a redox medium and the solid energy storage material in a storage tank, such that the energy density of the flow battery is improved. Therefore, it is urgent to develop a redox-targeting flow battery with high energy density and low cost at present.

Currently, solid energy storage materials used for a targeting-based flow battery include Prussian blue and derivatives thereof, polyanionic compounds (mainly phosphates, such as $LiFePO_4$, $Na_3V_2(PO_4)_3$, etc.), $Ni(OH)_2$-based materials, organic electrode materials (such as polyimide), etc. As a common lithium-ion electrode material, lithium iron phosphate (LFP) has the advantages of stable structure, abundant resources, low price and good thermal stability, and is free of toxicity, has a theoretical capacity as high as 170 mA h/g (equivalent to a capacity of 603 Ah/L), and becomes a research hotspot. In 2013, professor Qing Wang of National University of Singapore firstly used lithium ferro phosphate as a solid energy storage material and 1,10-dibromo ferrocene ($FcBr_2$) and ferrocene (Fc) as redox mediators to construct a flow battery. Half-wave potential ($E_{1/2}$) of the two mediators is 3.55 V and 3.25 V (vs. $Li^+/Li$) respectively, which crosses the half-wave potential (3.45 V) of $LiFePO_4$, and reversible chemical delithiation/lithiation is realized. The storage tank energy density of the redox-targeting flow battery is 6-12 times that of VRB. However, a glass-ceramic membrane has high resistivity and poor chemical and mechanical stability; and due to the complex electrolyte environment brought by the two redox mediators, redox molecules are easy to degrade, resulting in voltage loss and shortened cycle life. In order to optimize the electrolyte environment, in 2016, professor Qing Wang used iodide as a redox mediator. In various solvents, the iodide exhibits two redox reactions ($I^-/I_3^-$ and $I_3^-/I_2$). The potential of two redox pairs just crosses the potential of delithiation/lithiation of $LiFePO_4$, thus charge-discharge requirements of the $LiFePO_4$ are met. However, a large potential difference in the multi-step redox reaction still reduces the voltage efficiency of the battery. To address the inevitable voltage reduction caused by the multi-step reaction, professor Qing Wang proposed a single-molecule redox-targeting (SMRT) reaction. The SMRT reaction is a redox reaction, driven by a Nernst potential difference, between a single redox mediator and a solid energy storage material having the same potential. In the reaction process, ionic liquid of ferrocene branched fibers is used as a redox medium. A potential difference of the redox-targeting reaction is generated by activity change of the redox medium in a charge-discharge cycle process, such that the $LiFePO_4$ is subjected to reversible delithiation and lithiation, the voltage efficiency reaches 95% and a volume tank has the energy density remarkably improved to 330 Wh/L. However, the power density of such non-aqueous targeting flow lithium batteries is severely limited by the $Li^+$ conductivity of membrane material and an organic electrolyte. Besides, the solubility of active substances in the organic solution is also relatively low. The power density of the non-aqueous targeting flow lithium battery is far lower than that of an aqueous flow battery, and thus cannot meet the practical use requirement. Professor Qing Wang proposed an alkaline aqueous flow battery based on the SMRT reaction, wherein lithium ferro phosphate is used as the solid energy storage material and $[Fe(CN)_6]^{4-/3-}$ is used as the redox mediator. Under the current density of 5 $mA/cm^2$, the utilization rate of high-porosity $LiFePO_4$ particles is 73.3%, the specific capacity reaches 76 Ah/L and the theoretical specific capacity may reach 305 Ah/L. But the redox potential of the system $[Fe(CN)_6]^{4-/3-}$ is 100 mV higher than that of lithium ferro phosphate. In order to realize an effective SMRT reaction, a tetraglyme (TEGDME) organic cosolvent is used to adjust the redox potential of $[Fe(CN)_6]^{4-/3-}$, such that the dynamic performance is seriously damaged and the system can only work under low current density. It is newly reported that $LiFePO_4$ is used as a targeting energy storage material for an aqueous flow battery. Voltage loss is inevitably brought by two redox mediators, namely $Fc-SO_3Na$ and $BrFc—SO_3Na$, and the working current density of the whole system is relatively low. Therefore, it is urgent to develop a novel electrolyte system for a flow battery based on redox-targeting reaction of lithium ferro phosphate and realize practical development of the battery.

SUMMARY

The present disclosure provides a stable and high-capacity neutral aqueous redox flow lithium battery system based on redox-targeting reaction and solves the technical problem that an existing flow battery can only work at low current density. The present disclosure is based on a single-molecule redox-targeting (SMRT) reaction driven by a Nernst potential difference between $[Fe(CN)_6]^{4-/3-}$ and lithium ferro phosphate.

In order to solve the above technical problem, the present disclosure discloses a stable and high-capacity neutral aqueous redox flow lithium battery based on redox-targeting reaction, which includes a positive electrode storage tank and a negative electrode storage tank. The positive electrode storage tank is filled with a positive electrolyte, and the negative electrode storage tank is filled with a negative electrolyte. The flow lithium battery is characterized in that the positive electrolyte includes a salt containing $[Fe(CN)_6]^{4-}$ and/or $[Fe(CN)_6]^{3-}$, and the positive electrode storage tank is further filled with LFP particles.

Further defined, the LFP particle is prepared from 60 wt. %-80 wt. % of LFP, 10 wt. %-20 wt. % of carbon black and 10 wt. %-20 wt. % of a PVDF binder by a granulator.

Further defined, the concentration of the $[Fe(CN)_6]^{4-}$ in the positive electrolyte is 0.01 M-0.7 M; the concentration of the $[Fe(CN)_6]^{3-}$ in the positive electrolyte is 0.01 M-0.7 M; and every 11.5 mL of the positive electrolyte contains 2.0 g-2.5 g of positive electrode material.

Further defined, the positive electrolyte further includes a co-electrolyte.

Further defined, the co-electrolyte is LiCl, and the concentration of LiCl is 3 M.

Further defined, the negative electrolyte includes a salt containing $[Fe(CN)_6]^{4-}$ and/or $[Fe(CN)_6]^{3-}$.

Further defined, the negative electrolyte further includes LiCl.

Further defined, the negative electrolyte may further include $ZnCl_2$ and LiCl.

A $[Fe(CN)_6]^{4-/3-}$-LFP electrolyte system of the present disclosure is extremely stable. A constant current charge-discharge test is conducted at the current density of 20 mA/cm$^2$ and each cycle has a capacity retention rate of 99.97% within more than 330 h. The $[Fe(CN)_6]^{4-/3-}$-LFP electrolyte system has remarkable cycling stability and exhibits excellent volumetric specific capacity. The effective concentration of the electrolyte in a neutral aqueous solution reaches 7.946 M (212.95 Ah/L), which is much higher than other $[Fe(CN)_6]^{4-/3-}$-based electrolytes. When combined with a zinc negative electrode, a constructed Zn/$[Fe(CN)_6]^{3-}$-LFP flow battery has an energy density of 261.97 Wh/L at the current density of 20 mA/cm$^2$, and has an average Coulomb efficiency of 99.7% and the energy efficiency of 80.4%. Under 60 cycles of charge-discharge (190 h), each cycle of the system has a capacity retention rate of 98.76% (98.26% per day).

The LFP is introduced into the $[Fe(CN)_6]^{4-/3-}$-based electrolyte by the SMRT reaction, thus the electrolyte has obvious advantages over an electrolyte of the existing aqueous flow battery (FIG. 1A). As described above, it is demonstrated by various electrochemical and spectroelectrochemical measurements that the LFP and the $[Fe(CN)_6]^{4-/3-}$ have excellent stability in the neutral aqueous solution and the redox-targeting reaction between the LFP and the $[Fe(CN)_6]^{4-/3-}$ is reversible and efficient. The $[Fe(CN)_6]^{4-/3-}$-LFP electrolyte system has remarkable cycling stability and exhibits excellent volumetric specific capacity. The effective concentration of the electrolyte in the neutral aqueous solution reaches 7.928 M (212.47 Ah/L), which is much higher than other $[Fe(CN)_6]^{4-/3-}$-based electrolytes (FIG. 1B). Considering that the theoretical volumetric specific capacity of the redox-targeting-based electrolyte is as high as 305 Ah/L, it is expected to further increase the volumetric specific capacity by optimizing the microstructure of the LFP particles to improve the loading amount and reaction rate in the tank. In addition, the $[Fe(CN)_6]^{4-/3-}$ still has fast one-electron redox transfer on a cheap carbon felt electrode even without a catalyst. A crossover through a cation exchange membrane is small, thus costs of battery stack and system maintenance can be further reduced. Furthermore, the concentration required on the $[Fe(CN)_6]^{4-/3-}$ is relieved with the LFP, thus the conductivity of the electrolyte can be better controlled to reduce a shunt current. Because of the characteristics described above, the $[Fe(CN)_6]^{4-/3-}$-LFP electrolyte system and the flow battery made from the system have considerable competitive advantages in performance (energy density, service life, etc.), costs (materials and maintenance) and safety, and show a broad prospect for large-scale energy storage application.

DETAILED DESCRIPTION

Example 1

Figure 1A:
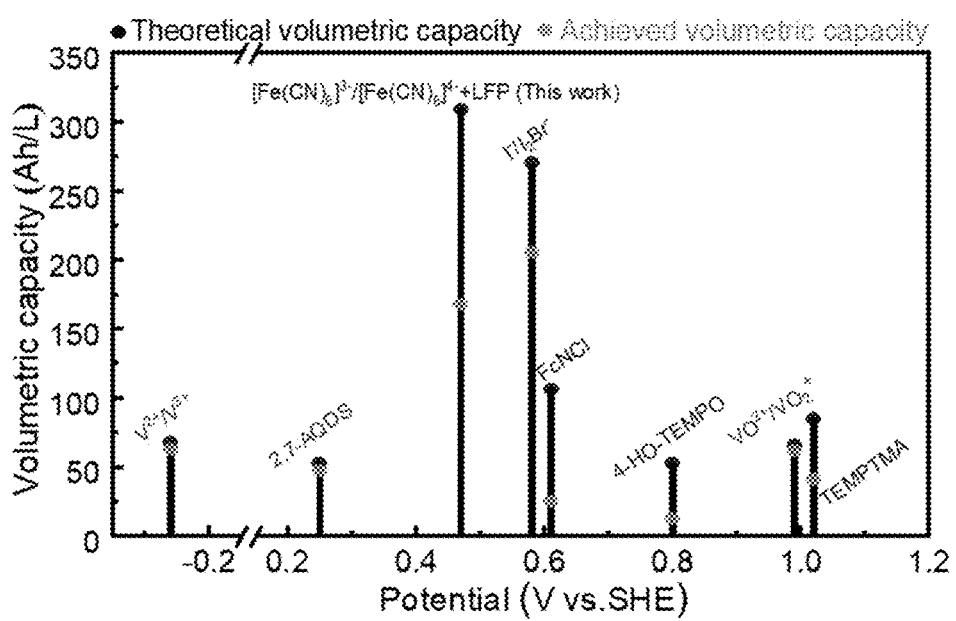
FIG. 1A shows comparison of volumetric specific capacities of redox systems in various aqueous flow batteries.
Figure 1B:
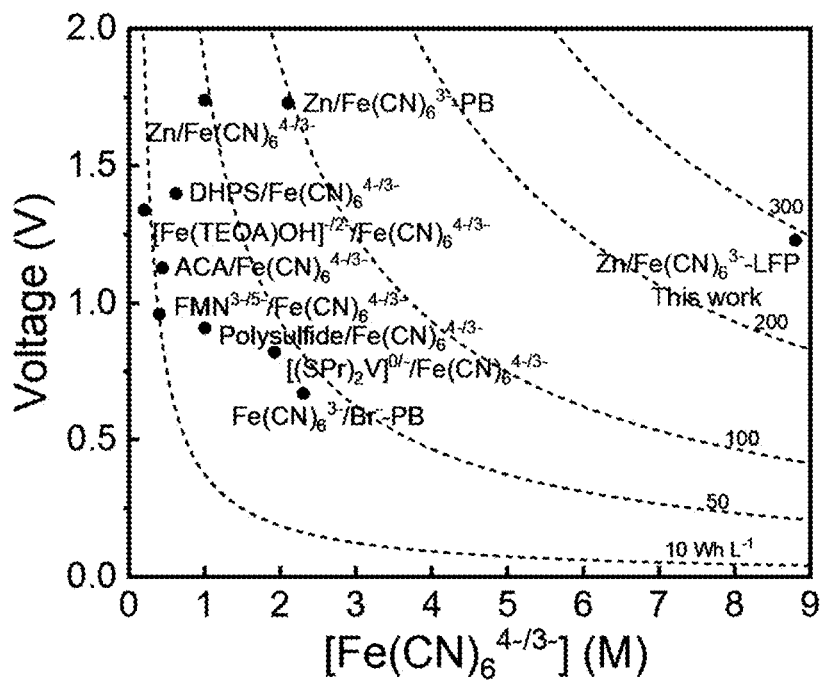
FIG. 1B shows comparison of cell voltage, effective concentration of $[Fe(CN)_6]^{4-/3-}$ and energy density of various $[Fe(CN)_6]^{4-/3-}$-based electrolyte systems.
Figure 2:
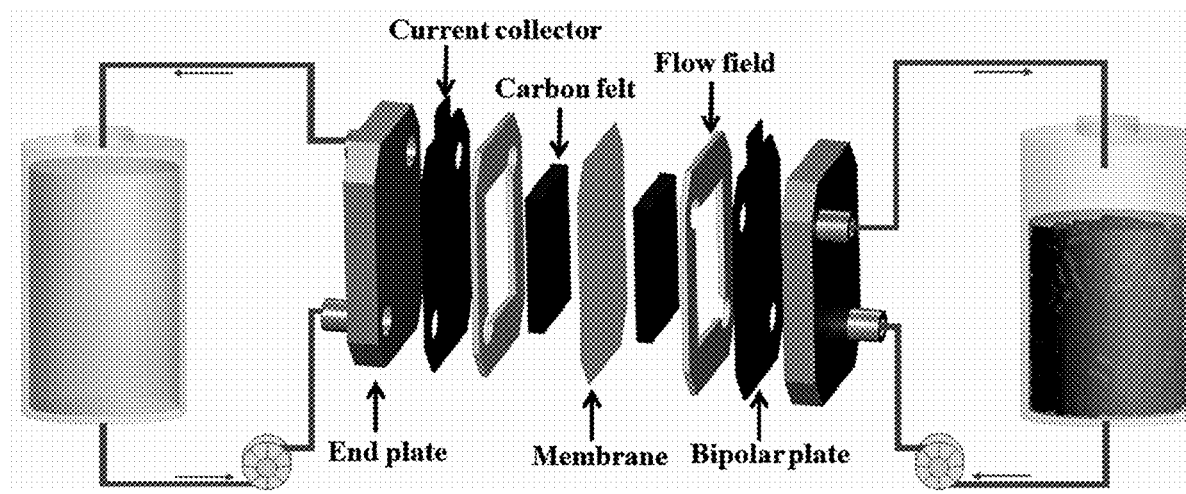
FIG. 2 is a schematic diagram of a symmetric flow battery composed of an electrochemical single cell and two energy storage tanks.

As shown in FIG. 2, a flow battery included clamping plates, endplates, current collectors, bipolar plates, electrode frames, electrodes, an ion exchange membrane and sealing gaskets. Two side surfaces of the ion exchange membrane were respectively connected with the electrodes, the electrode frames, the bipolar plates, the current collectors, the endplates and the clamping plates in sequence, and the clamping plates at two sides were fixedly connected through screws. The clamping plates were made of stainless steel; the endplates were made of polytetrafluoroethylene; the current collectors were made of copper sheets; the bipolar plates were made of flexible graphite; the electrode frames were made of polytetrafluoroethylene; the electrodes were graphite felt electrodes; and the sealing gaskets were silicone sealing gaskets. As for a $[Fe(CN)_6]^{4-/3-}$-LFP/FP symmetric flow battery and a Zn/$[Fe(CN)_6]^{3-}$-LFP aqueous flow battery, the battery effective area was 4.5×3.0 cm². A cation exchange membrane Nafion 117 was soaked in deionized water at 80° C. for 15 min, then soaked in 2 M $H_2SO_4$ for 1.5 h for 15 min, and then soaked in a 2 M LiCl solution for 3 h before use, which was used to separate positive and negative electrolytes. Electrochemically treated carbon felt was used as the electrodes. The electrochemical treatment was conducted in a two-electrode device, in which the original carbon felt was used as a cathode and an anode simultaneously; and a 0.1 M $(NH_4)_2SO_4$ aqueous solution was used as an electrolyte. The distance between the two electrodes was maintained at about 2 cm during the electrochemical process. A positive bias of 10 V was applied to both sides of the carbon felt for 1 min and the felt was washed several times with deionized water to remove the residual electrolyte.

A electrolyte of 0.35 M $K_4Fe(CN)_6$, 0.35 M $K_3Fe(CN)_6$ and 3 M LiCl was used as the positive electrolyte and the negative electrolyte; the dosage of the positive electrolyte was 11.5 mL; the dosage of the negative electrolyte was 40 mL; and a positive electrode storage tank was filled with 2.3 g of LFP particles (the LFP content was 80 wt. %).

The LFP particles were prepared from 80 wt. % of LFP, 10 wt. % of carbon black and 10 wt. % of a PVDF binder by a granulator.

Example 2

The difference between this example and Example 1 was in that a neutral solution of 11.5 mL of 0.7 M $[Fe(CN)_6]^{3-}$ and 3 M LiCl supporting salt was used as a positive electrolyte; a neutral solution of 40 mL of 0.35 M $ZnCl_2$ and 3 M LiCl supporting salt was used as a negative electrolyte; and a positive electrode storage tank was filled with 2.1 g of LFP particles (the LFP content was 80 wt. %). The device used and other steps and parameters were the same as those in Example 1.

According to a Nernst equation of lithiation and delithiation of lithium ferro phosphate, the redox potential of lithium ferro phosphate is adjusted by changing the concentration of Li⁺ (1 M-10 M) in the electrolyte solution to realize match with a redox potential of $[Fe(CN)_6]^{4-/3-}$. The redox potential of lithium ferro phosphate is measured using an electrochemical workstation (CHI660D, CH Instruments) in a three-electrode configuration consisting of glassy carbon (working electrode), a platinum sheet (counter electrode) and an Ag/AgCl reference electrode (0.21 V vs. SHE), so as to realize an efficient SMRT reaction.

A $[Fe(CN)_6]^{4-/3-}$-LFP/FP symmetric flow battery is constructed in the present disclosure to verify effectiveness and reversibility of the SMRT reaction between the $[Fe(CN)_6]^{4-/3-}$ and LFP/FP, as well as the volumetric specific capacity and cycle stability of a $[Fe(CN)_6]^{4-/3-}$-LFP electrolyte. The $[Fe(CN)_6]^{4-/3-}$-LFP/FP symmetric flow battery uses active substances of the same concentration as the positive electrolyte and the negative electrolyte. Constant-current charge-discharge is conducted at certain current density with a voltage range of −0.5 V to 0.5 V. After two cycles, a certain amount of the LFP particles are loaded into a positive electrode tank for continuous charge-discharge.

According to the present disclosure, a reaction mechanism of $[Fe(CN)_6]^{4-/3-}$ and LFP/FP is explored by measuring the concentration of $K_3Fe(CN)_6$ by an in-situ ultraviolet technology. In-situ ultraviolet-visible spectrum measurement is to collect in-situ ultraviolet-visible spectra of the positive electrolytes with and without LFP of the $[Fe(CN)_6]^{4-/3-}$ symmetric flow battery using a METASH 8000 spectrometer. The $[Fe(CN)_6]^{4-/3-}$-LFP/FP symmetric flow battery contains the positive electrolyte and the negative electrolyte at the same concentration. After an initial cycle of charge-discharge, the ultraviolet-visible spectrum of the positive electrolyte without LFP is recorded. A certain amount of the LFP particles are loaded into the positive electrode tank, and the in-situ ultraviolet-visible spectrum of the battery positive electrolyte is measured at the same current density.

The present disclosure cooperates with a zinc negative electrode to construct a Zn/$[Fe(CN)_6]^{3-}$-LFP flow battery to explore the energy density and cycle stability of the flow battery. A positive electrolyte of a Zn/$[Fe(CN)_6]^{3-}$-LFP aqueous flow battery is composed of $K_3Fe(CN)_6$ and LiCl supporting salt; and a negative electrolyte is composed of $ZnCl_2$ and LiCl supporting salt. A piece of zinc metal and carbon felt are used as a negative electrode. A voltage range is 0.6-1.8 V. After a cycle of charge-discharge, a certain amount of the LFP particles are loaded into the positive electrode tank for continuous charge-discharge.

A Nernst equation for lithiation and delithiation of lithium ferro phosphate is shown as follows:

$$FePO_4 + Li^+ + e^- \leftrightarrow LiFePO_4$$

$$E_{LFP} = E_{LFP}^0 + \frac{RT}{F}\ln\alpha_{Li^+}$$

Figure 3A:
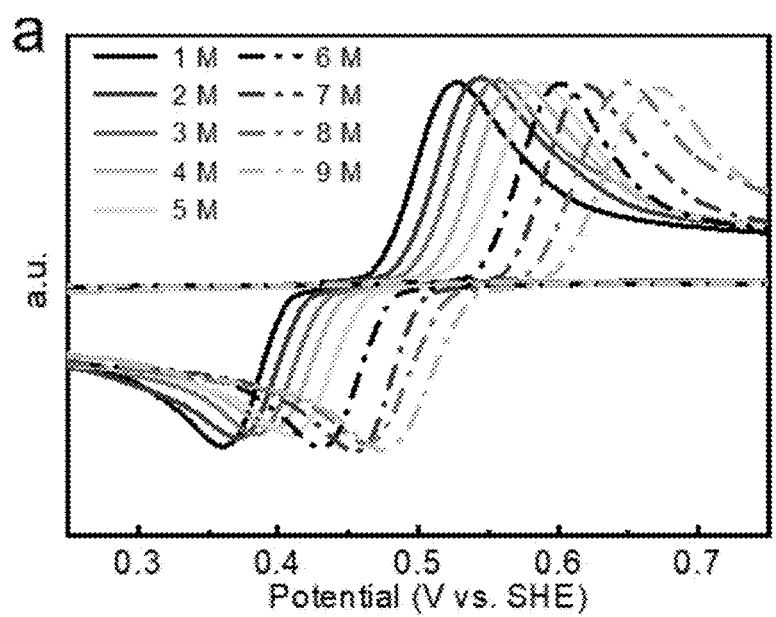
FIG. 3A is a cyclic voltammogram of LFP under different concentrations of LiCl.
Figure 3B:
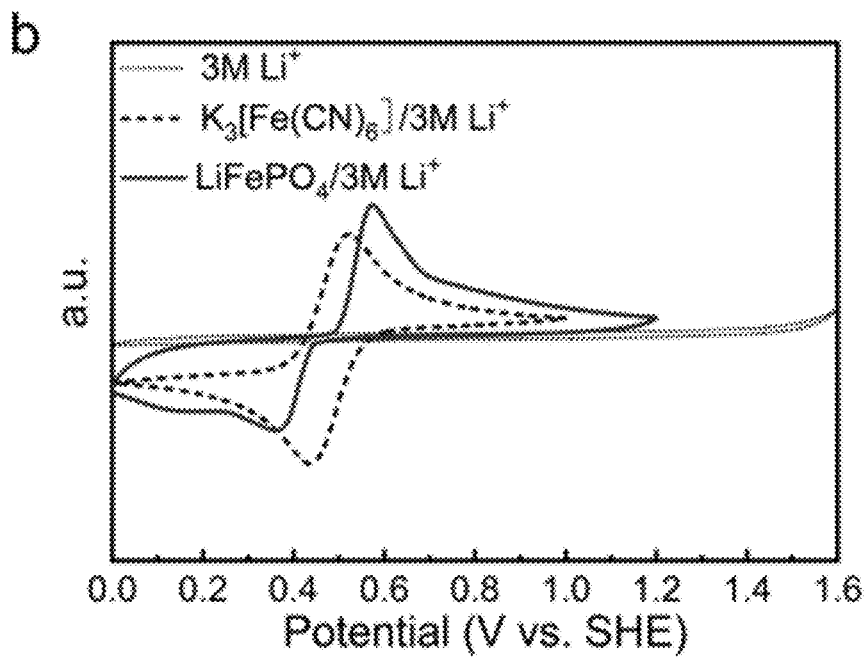
FIG. 3B is a cyclic voltammogram of LFP and $[Fe(CN)_6]^{3-}$ when an electrolyte is 3 M LiCl.

According to the Nernst equation of lithium ferro phosphate, it is found that a change of Li⁺ activity in the solution will cause a shift in its redox potential. The Li' activity is affected by Li' concentration and pH of the solution, therefore, the redox potential of lithium ferro phosphate can be adjusted by changing the Li⁺ concentration in a neutral solution. A cyclic voltammogram of LFP is tested when the electrolyte is 1 M-9M LiCl (FIG. 3A). When the electrolyte concentration is 3 M LiCl, the redox potential of LFP/FP is comparable to that of $[Fe(CN)_6]^{3-}/[Fe(CN)_6]^{4-}$, which is a thermodynamic basis for bidirectional SMRT reactions between $[Fe(CN)_6]^{3-}$ and LFP, as well as between $[Fe(CN)_6]^{4-}$ and FP driven by Nernst potential differences.

Figure 4A:
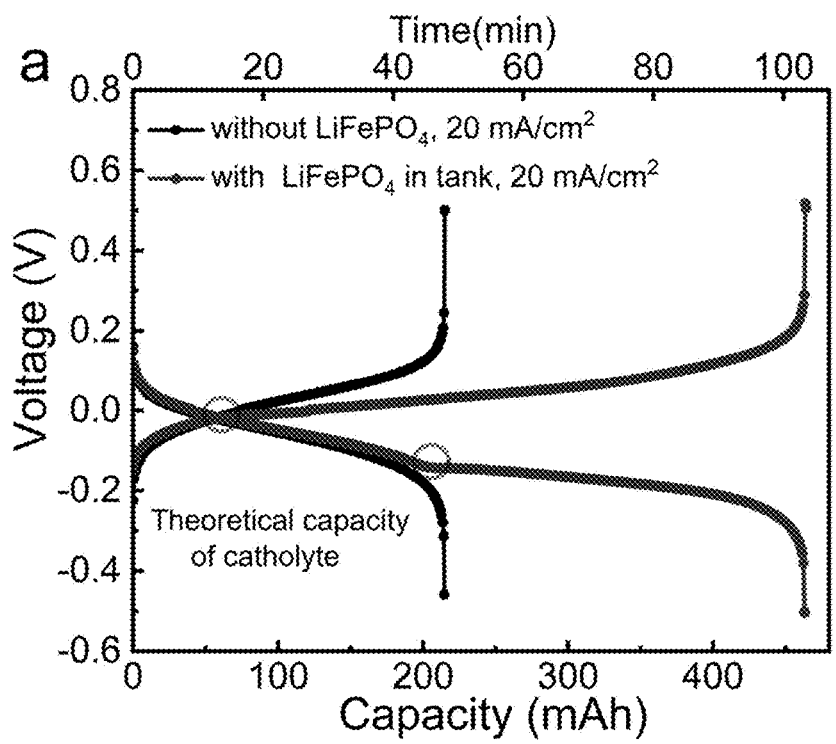
FIG. 4A is a voltage curve before and after adding the LFP of the $[Fe(CN)_6]^{4-/3-}$ symmetric flow battery under the current density of 20 mA/cm$^2$.
Figure 4B:
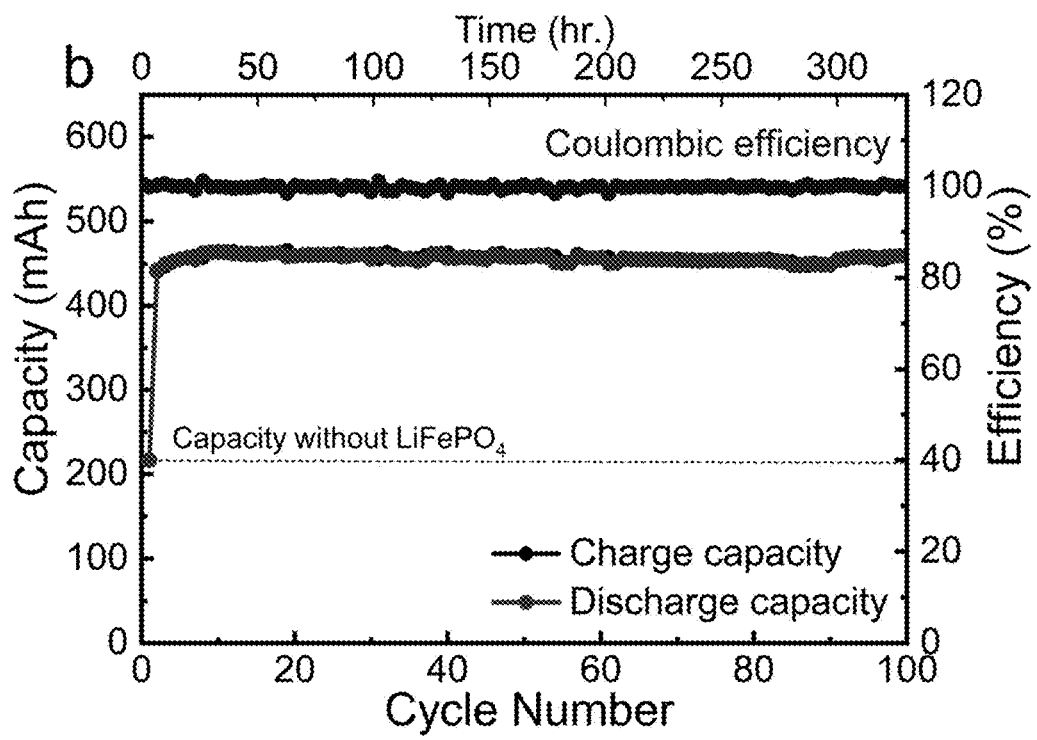
FIG. 4B is a cyclic stability curve of the $[Fe(CN)_6]^{4-/3-}$ symmetric flow battery under the current density of 20 mA/cm$^2$.

The $[Fe(CN)_6]^{4-/3-}$-LFP symmetric aqueous flow battery is assembled to verify redox-targeting reaction for a flow battery, as shown in FIG. 2. Electrolyte components in the positive electrolyte and the negative electrolyte are kept the same. 11.5 mL and 40 mL of the electrolyte composed of 0.35 M $K_4Fe(CN)_6$, 0.35 M $K_3Fe(CN)_6$ and 3 M LiCl are used as the positive electrolyte and the negative electrolyte. Constant-current charge-discharge measurement is carried out at the current density of 20 mA/cm², as shown in FIG. 4A. $[Fe(CN)_6]^{4-/3-}$ shows nearly 100% capacity (213.5 mAh) in the flow battery without LFP loaded. Subsequently, 2.3 g of the LFP particles (80 wt. % of LFP, 294.4 mAh) are added to the storage tank, the discharge capacity is increased to 248.6 mAh and the corresponding utilization rate of the LFP is 84.4%. The volumetric specific capacity of the storage tank reaches 40.3 Ah/L and the maximum volumetric specific capacity reached by adding the LFP particles is 212.95 Ah/L (7.946 M). The $[Fe(CN)_6]^{4-/3-}$-LFP symmetric flow battery shows about 100% Coulombic efficiency since the redox-targeting reaction has good reversibility and the $[Fe(CN)_6]^{4-/3-}$ has fewer crossovers between cation exchange membranes. The $[Fe(CN)_6]^{4-/3-}$-LFP symmetric flow battery is tested for charge-discharge stability to investigate durability of the electrolyte system. Under the current density of 20 mA/cm$^2$ and 100 cycles of charge-discharge (about 330 h), the capacity retention rate of the system is 99.97% each time (99.80% per day).

Figure 5A:
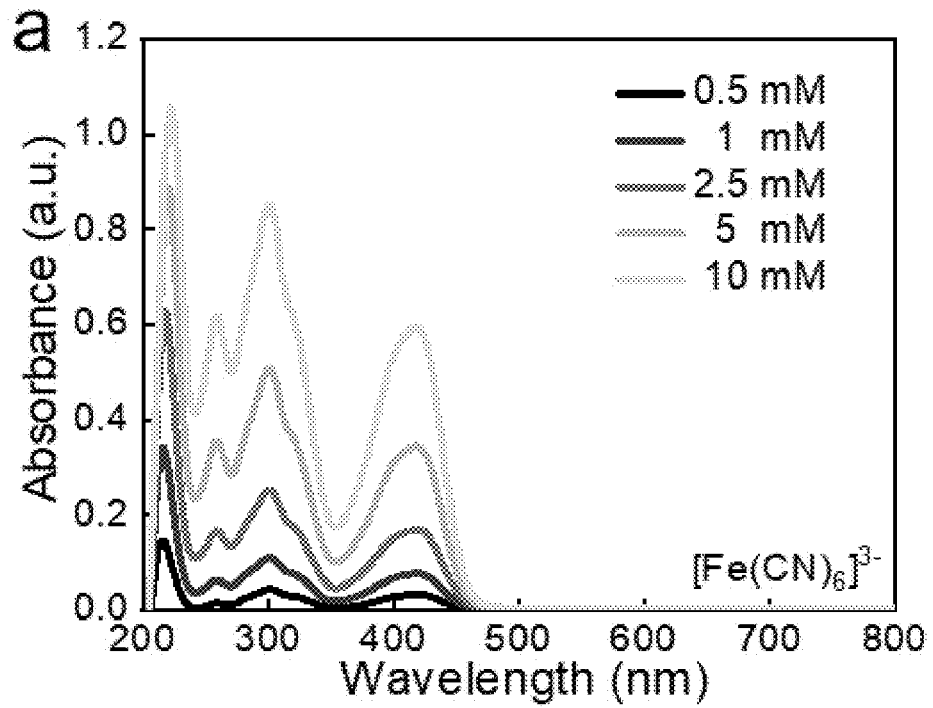
FIG. 5A-5B is an ultraviolet-visible spectrum of $[Fe(CN)_6]^{4-/3-}$ in 3 M LiCl, wherein A $K_3Fe(CN)_6$ and B $K_4Fe(CN)_6$.
Figure 5B:
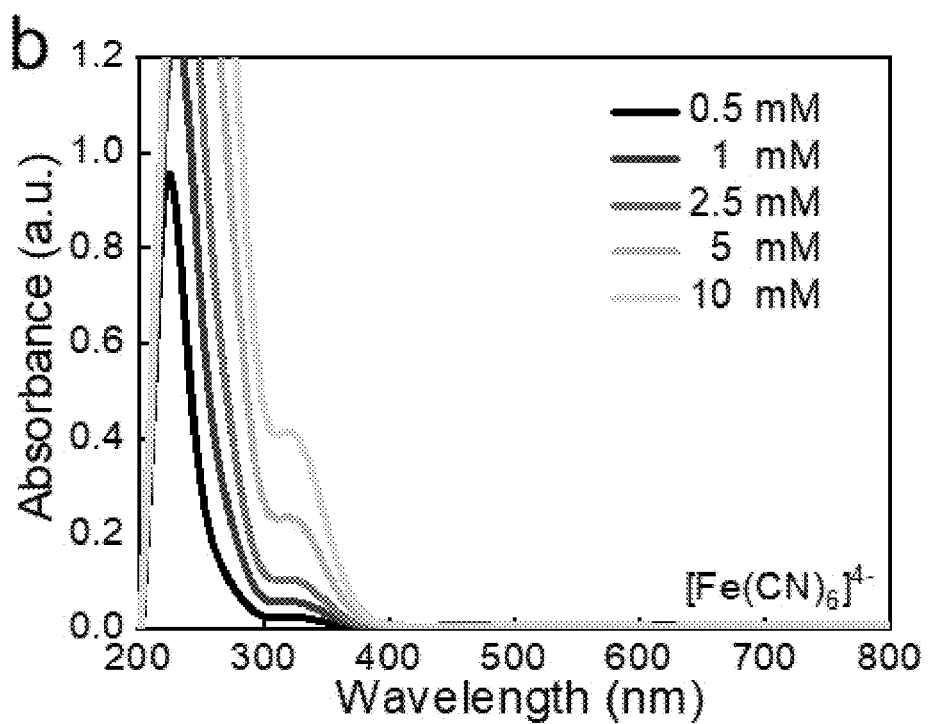

A reaction mechanism of $[Fe(CN)_6]^{4-/3-}$ and LFP/FP is explored by monitoring concentration of $K_3Fe(CN)_6$ and $K_4Fe(CN)_6$ by an in-situ ultraviolet technology. Through the ultraviolet-visible spectra of the $K_3Fe(CN)_6$ and the $K_4Fe(CN)_6$ in 3 M LiCl (FIG. 5A-5B), it can be found that the $K_4Fe(CN)_6$ is almost transparent at wavelengths greater than 400 nm, while the $K_3Fe(CN)_6$ shows significant absorption. Therefore, it is feasible to reflect the state of the flow battery at different charge/discharge stages by measuring the concentration change of the $K_3Fe(CN)_6$.

Figure 6A:
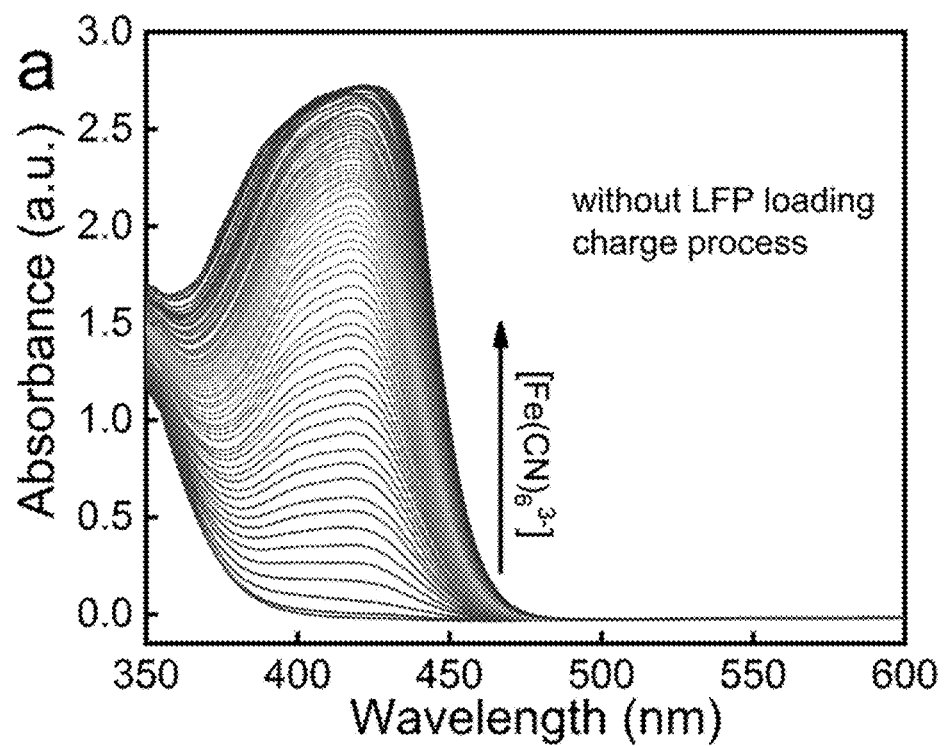
FIG. 6A-6D shows in-situ ultraviolet-visible spectrum measurements of a positive electrolyte of the $[Fe(CN)_6]^{4-/3-}$ symmetric flow battery during charge/discharge, wherein (a, c) ultraviolet-visible spectra and (b, d) absorbance change and corresponding flow battery voltage curve of the electrolyte recorded at 460 nm.
Figure 6B:
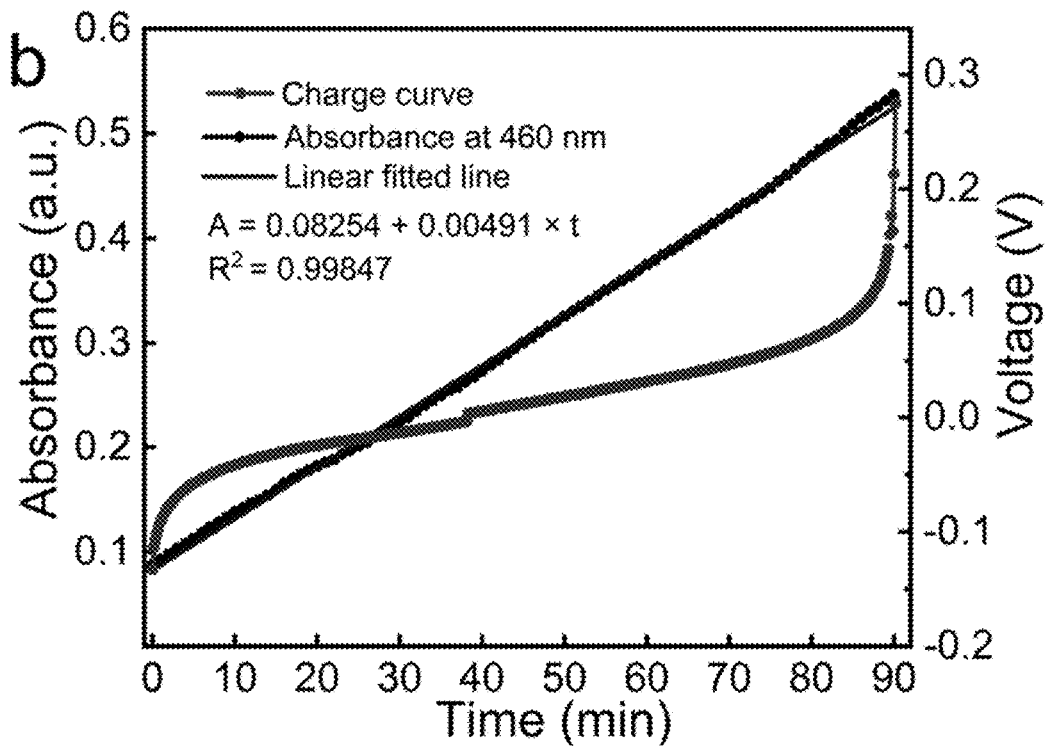
Figure 6C:
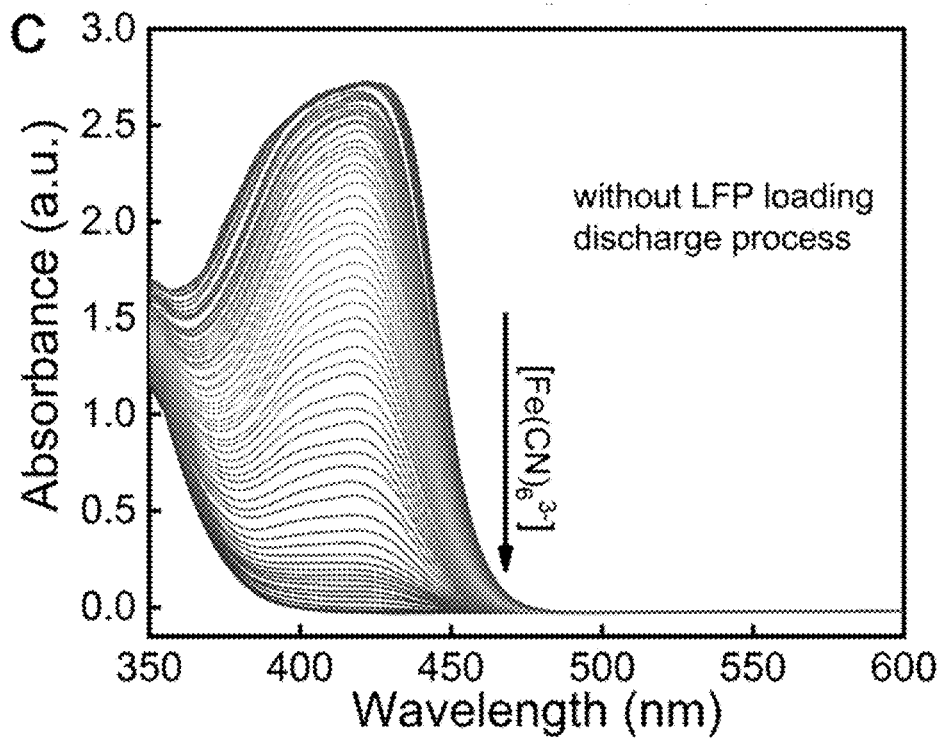
Figure 6D:
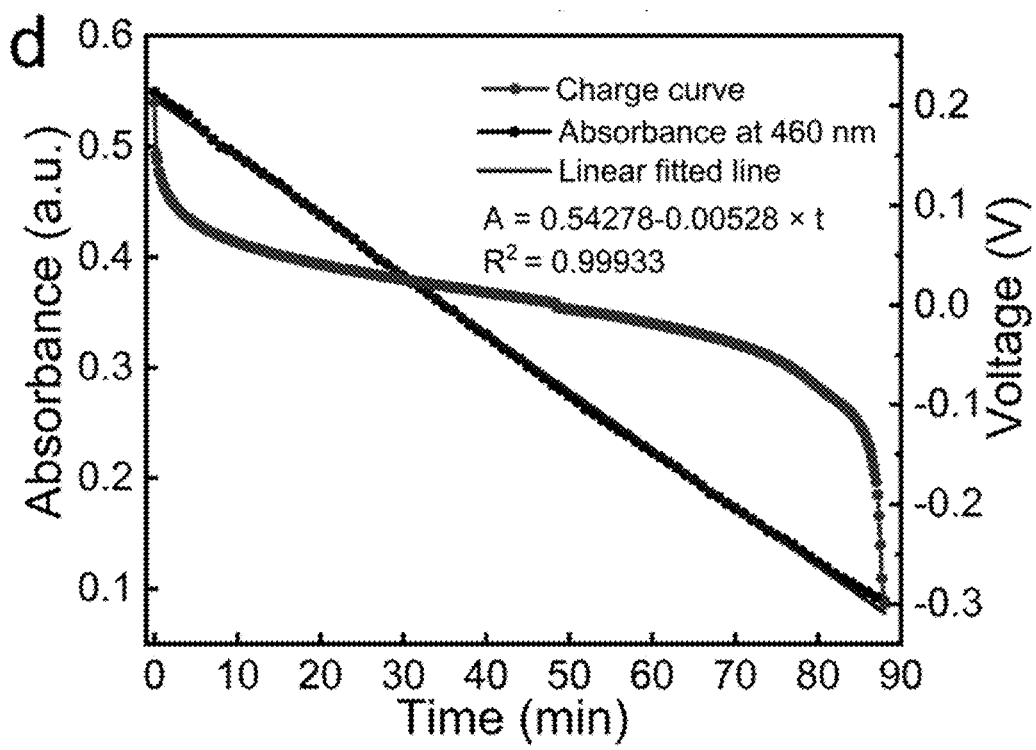

The $[Fe(CN)_6]^{4-/3-}$-LFP/FP symmetric flow battery with an electrode area of 4 cm$^2$ consists of 11.0 mL of a positive electrolyte and 40.0 mL of a negative electrolyte (0.01 M $K_3Fe(CN)_6$ and 0.01 M $K_4Fe(CN)_6$). The battery is charged/discharged at 0.5 mA/cm$^2$. After an initial cycle, in the absence of LFP, the ultraviolet-visible spectra of the positive electrolyte of the $[Fe(CN)_6]^{4-/3-}$ symmetric flow battery at different charge/discharge stages are recorded, as shown in FIG. 6A and FIG. 6C. When the electrolyte concentration is relatively high, a value of an absorption peak (about 420 nm) is beyond a detection range, such that the absorption peak at 460 nm is measured to determine the concentration of the $Fe(CN)_6^{3-}$ at different charge/discharge stages. It is obvious that the concentration change of the $Fe(CN)_6^{3-}$ is linear during the charge-discharge process.

Figure 7A:
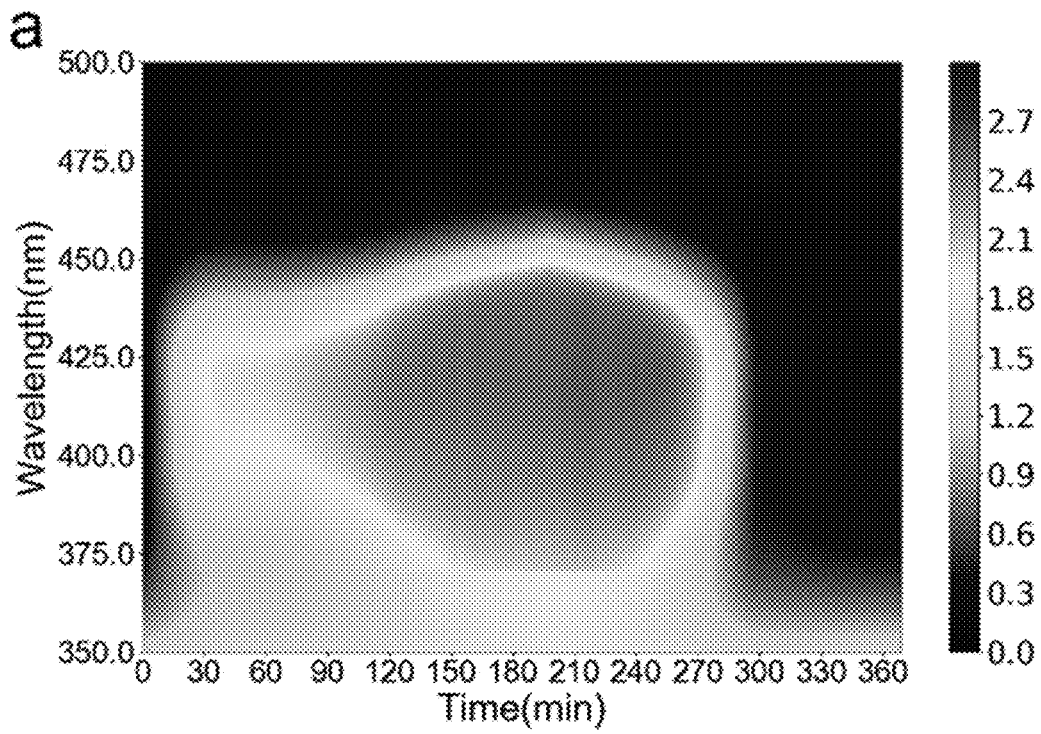
FIG. 7A is an in-situ ultraviolet-visible spectrum of the positive electrolyte of the symmetric flow battery during charge/discharge after LFP (26 mg) is loaded.
Figure 7B:
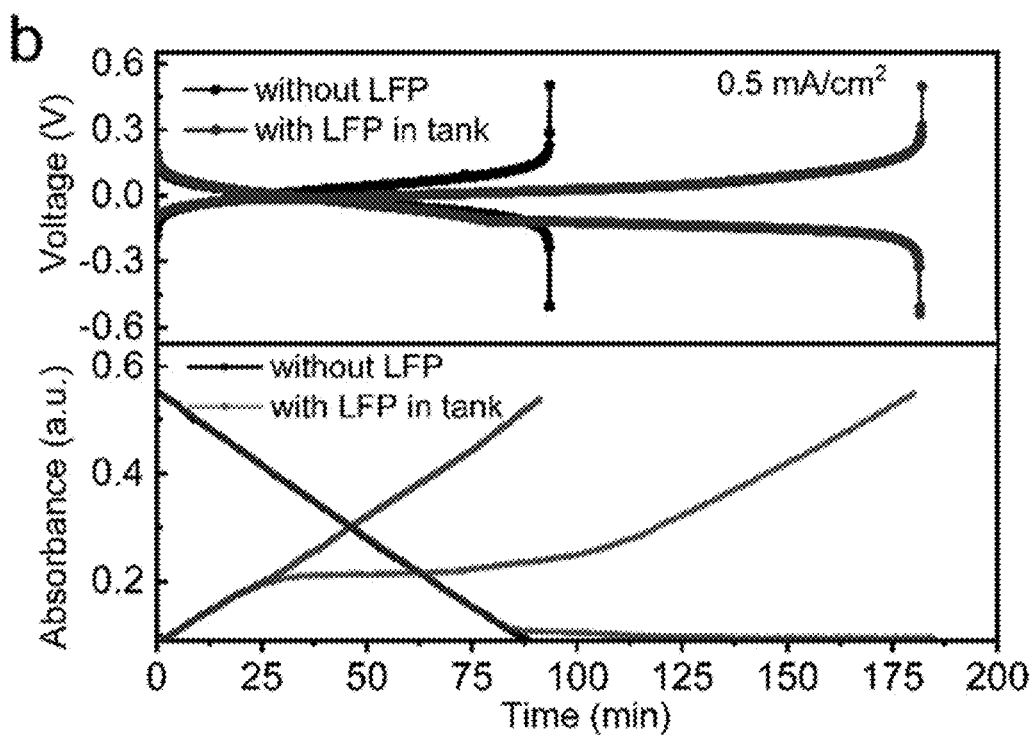
FIG. 7B is a charge-discharge curve (top) of the $[Fe(CN)_6]^{4-/3-}$ symmetric flow battery and a $[Fe(CN)_6]^{3-}$ concentration changing curve over time (bottom)

After the in-situ ultraviolet-visible spectra without LFP are measured, 26 mg of the LFP particles (80 wt. %, about 1.1 times the capacity of the positive electrolyte) are loaded into the positive electrode storage tank. Besides, the flow battery continuously charges and discharges at the current density of 0.5 mA/cm$^2$. The in-situ ultraviolet-visible spectra after the LFP is loaded at this time are measured, as shown in FIG. 7A. A charge-discharge curve of the $[Fe(CN)_6]^{4-/3-}$-LFP symmetric flow battery (top of FIG. 7B) and a $[Fe(CN)_6]^{3-}$ concentration changing curve over time (bottom of FIG. 7B) are compared. It is found that during the first 25 min of the charging process, the concentration change of the $[Fe(CN)_6]^{3-}$ is linear, which indicates that even in the presence of the LFP, the process only involves electrochemical reduction of the $[Fe(CN)_6]^{3-}$. The concentration change of the $[Fe(CN)_6]^{3-}$ begins to deviate from the linearity at around 28% SOC, which indicates the occurrence of the SMRT reaction. The concentration of the $[Fe(CN)_6]^{3-}$ reaches a steady state at 34% SOC, which indicates a dynamic equilibrium of formation of the $[Fe(CN)_6]^{3-}$ at the electrode and consumption of the $[Fe(CN)_6]^{3-}$ in the storage tank by reaction of the LFP and the $[Fe(CN)_6]^{3-}$ during charge. The situation is similar in the discharge process, during the first 80 min, the concentration change of the $[Fe(CN)_6]^{3-}$ is linear. The concentration change of the $[Fe(CN)_6]^{3-}$ begins to deviate from the linearity at around 9% SOC, which indicates the occurrence of the SMRT reaction. The concentration of the $[Fe(CN)_6]^{3-}$ reaches a steady state at 3% SOC, which indicates a dynamic equilibrium of consumption of the $[Fe(CN)_6]^{3-}$ at the electrode and formation of the $[Fe(CN)_6]^{3-}$ in the storage tank by reaction of the FP and the $[Fe(CN)_6]^{4-}$ during discharge. In this case, the total flux of electric charge of the $[Fe(CN)_6]^{4-/3-}$ electrolyte is zero and the current is equivalent to only passing through the LFP, which is ideal for continuous operation.

A zinc metal becomes a promising negative electrode material for various batteries due to the negative redox potential and low cost. $Zn/[Fe(CN)_6]^{3-}$ redox flow batteries have been widely used for stationary energy storage. However, the energy density of the system is relatively low, which is mainly caused by low capacity of the $[Fe(CN)_6]^{4-/3-}$ electrolyte. Therefore, a $[Fe(CN)_6]^{4-/3-}$-LFP electrolyte system based on redox-targeting reaction is introduced to enhance the energy density of the flow battery. Reaction on the zinc side is as follows:

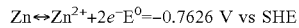

$$Zn \leftrightarrow Zn^{2+}+2e^- \quad E^0=-0.7626 \text{ V vs SHE}$$

Figure 8A:
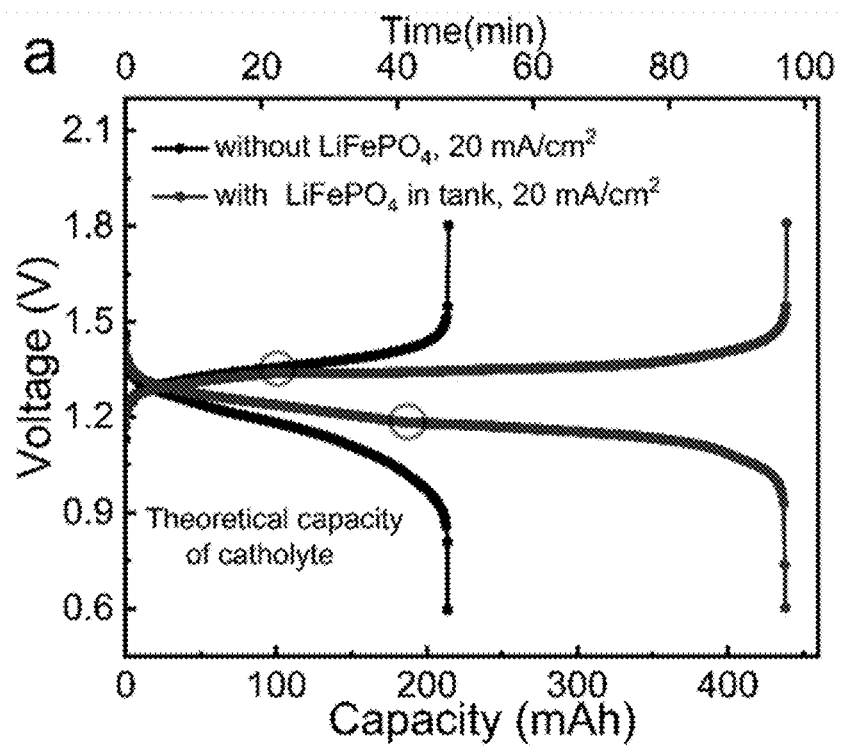
FIG. 8A shows a voltage curve before and after adding the LFP and FIG. 8B a cyclic stability curve of a Zn/$[Fe(CN)_6]^{3-}$-LFP flow battery under the current density of 20 mA/cm$^2$.
Figure 8B:
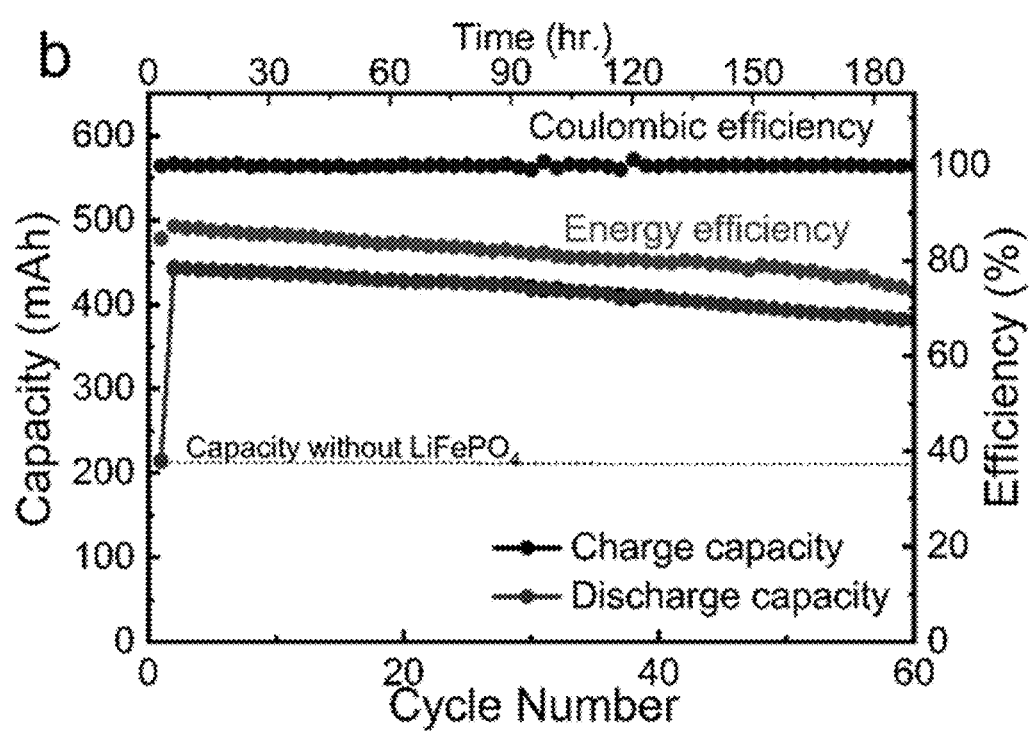

When a neutral solution of 11.5 mL of 0.7 M $[Fe(CN)_6]^{3-}$ and 3 M LiCl supporting salt is used as the positive electrolyte, a neutral solution of 40 mL of 0.35 M $ZnCl_2$ and 3 M LiCl supporting salt is used as the negative electrolyte, and 2.1 g of LFP particles (80 wt. % of LFP) are loaded into the positive electrode storage tank, the volumetric specific capacity of the storage tank reaches 38.54 Ah/L (the LFP utilization rate is 84.2%). The maximum volumetric specific capacity reached by adding the LFP particles is 212.47 Ah/L (7.928 M, FIG. 8A-8B). Since the voltage of the flow battery is 1.233 V, the energy density can reach 261.97 Wh/L, which is more than twice the highest reported. In addition, the $Zn/[Fe(CN)_6]^{3-}$-LFP flow battery has a very high average Coulombic efficiency of 99.7% due to the minimal crossover of the $[Fe(CN)_6]^{4-/3-}$ and inhibition of hydrogen evolution reaction in the zinc negative electrode. Moreover, the average voltage and energy efficiency of $Zn/[Fe(CN)_6]^{3-}$-LFP flow battery are 80.1% and 80.4% respectively at the current density of 20 mA/cm$^2$. Under charge-discharge for 60 cycles (190 h), the capacity retention rate of the system is 98.76% per time (98.26% per day). Capacity fading and energy efficiency fading are mainly caused by reaction of $[Fe(CN)_6]^{4-/3-}$ with zinc ions to generate Prussian blue analogs (ZnHCF).

What is claimed is:

1. A stable and high-capacity neutral aqueous redox flow lithium battery based on redox-targeting reaction, comprising a positive electrode storage tank and a negative electrode storage tank, wherein the positive electrode storage tank is filled with a positive electrolyte, the negative electrode storage tank is filled with a negative electrolyte, the flow lithium battery is characterized in that the positive electrolyte comprises a salt containing $[Fe(CN)_6]^{4-}$ and/or $[Fe(CN)_6]^{3-}$, and the positive electrode storage tank is further filled with lithium iron phosphate (LFP) particles and/or ferric phosphate (FP) particles; wherein the positive electrolyte further comprises a co-electrolyte, wherein the co-electrolyte is LiCl, and the concentration of LiCl is 3 M; wherein the negative electrolyte comprises $ZnCl_2$ and LiCl.

2. The flow lithium battery according to claim 1, wherein the LFP particle is prepared from 60 wt. %-80 wt. % of LFP, 10 wt. %-20 wt. % of carbon black and 10 wt. %-20 wt. % of a PVDF binder.

3. The flow lithium battery according to claim 1, wherein the concentration of the $[Fe(CN)_6]^{4-}$ in the positive electrolyte is 0.01 M-0.7 M, the concentration of the $[Fe(CN)_6]^{3-}$ in the positive electrolyte is 0.01 M-0.7 M, and every 11.5 mL of the positive electrolyte contains 2.0 g-2.5 g of positive electrode material.

4. The flow lithium battery according to claim 1, wherein the negative electrolyte comprises a salt containing $[Fe(CN)_6]^{4-}$ and/or $[Fe(CN)_6]^{3-}$.

5. The flow lithium battery according to claim 1, wherein a neutral solution of 11.5 mL of 0.7 M $[Fe(CN)_6]^{3-}$ and 3 M LiCl supporting salt is used as the positive electrolyte, a neutral solution of 40 mL of 0.35 M $ZnCl_2$ and 3 M LiCl supporting salt is used as the negative electrolyte, the positive electrode storage tank is filled with 2.1 g of LFP particles, and the content of LFP in the LFP particles is 80 wt. %.

* * * * *